Sept. 4, 1951 H. R. SCHUTZ 2,567,033
COMBINED GLASS BURN OFF AND TRANSFER MACHINE
Filed May 23, 1947 10 Sheets-Sheet 3

Inventor
H. R. SCHUTZ
By Rule & Hoge,
Attorneys

Sept. 4, 1951      H. R. SCHUTZ      2,567,033
COMBINED GLASS BURN OFF AND TRANSFER MACHINE
Filed May 23, 1947      10 Sheets-Sheet 4
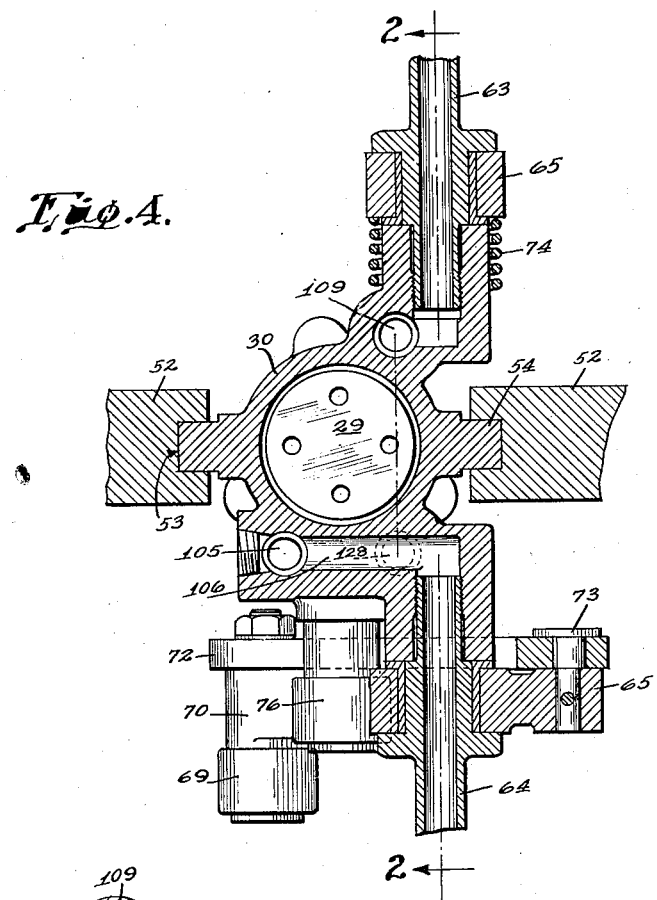
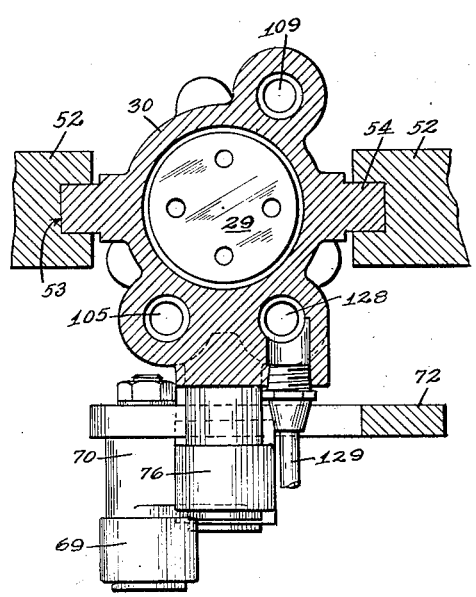
Inventor
H. R. SCHUTZ
By Rule & Hoge
Attorneys Sept. 4, 1951        H. R. SCHUTZ        2,567,033
COMBINED GLASS BURN OFF AND TRANSFER MACHINE Filed May 23, 1947        10 Sheets-Sheet 6

Inventor
H. R. SCHUTZ
By Rule and Hoge,
Attorneys

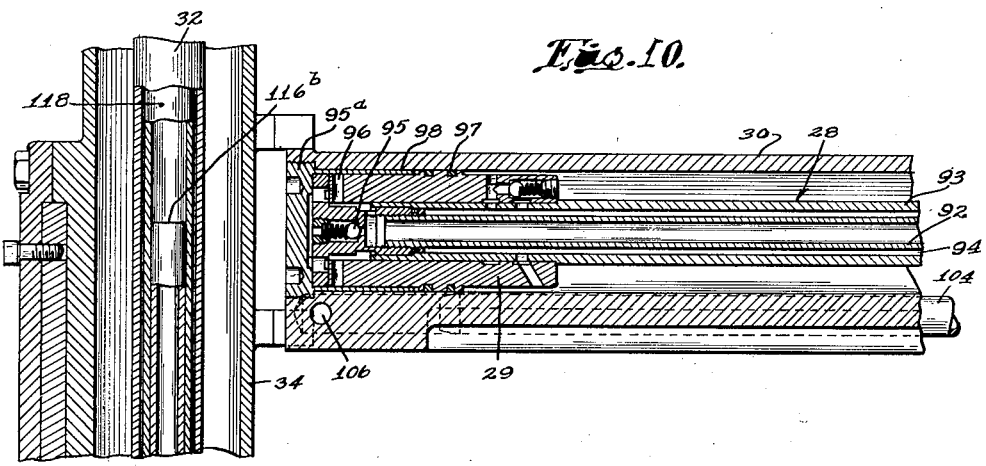
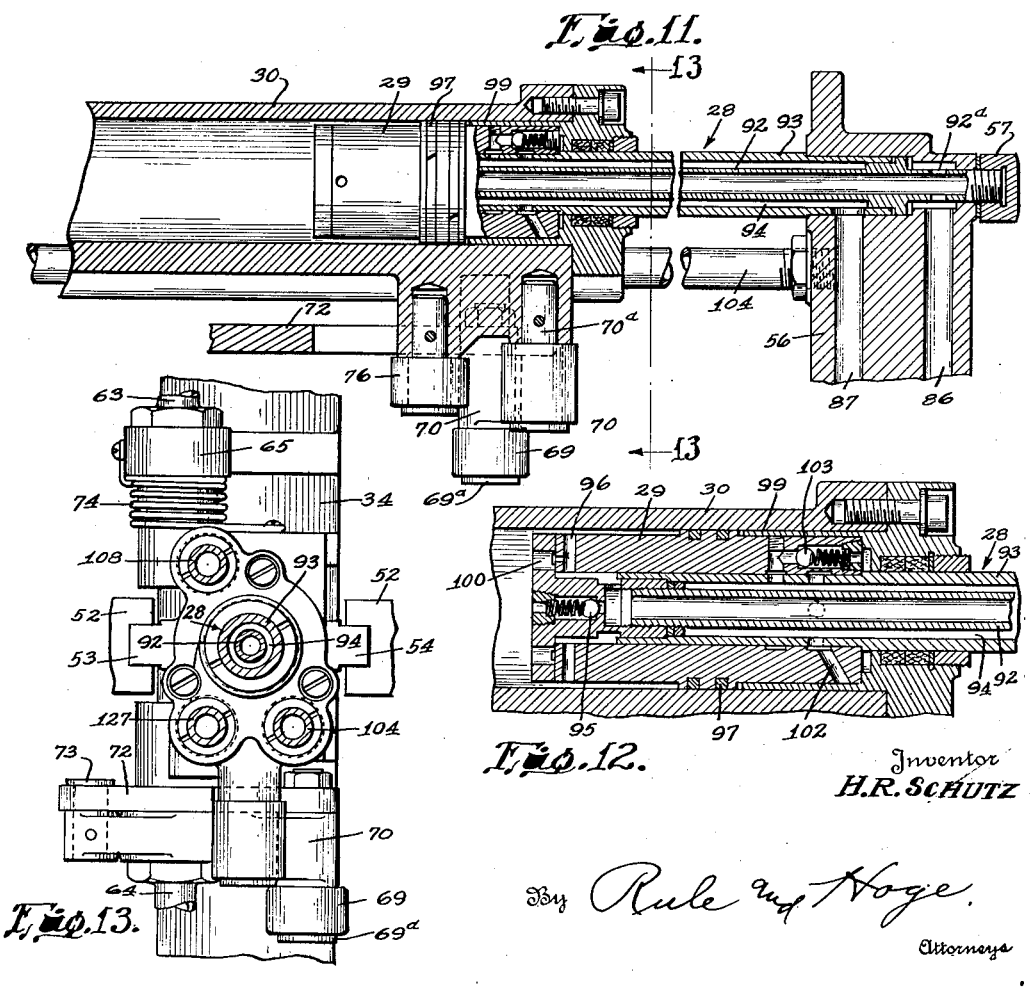

Inventor
H. R. SCHUTZ
By Rule & Hoge,
Attorneys

Inventor
H. R. SCHUTZ
By Rule and Hoge,
Attorneys

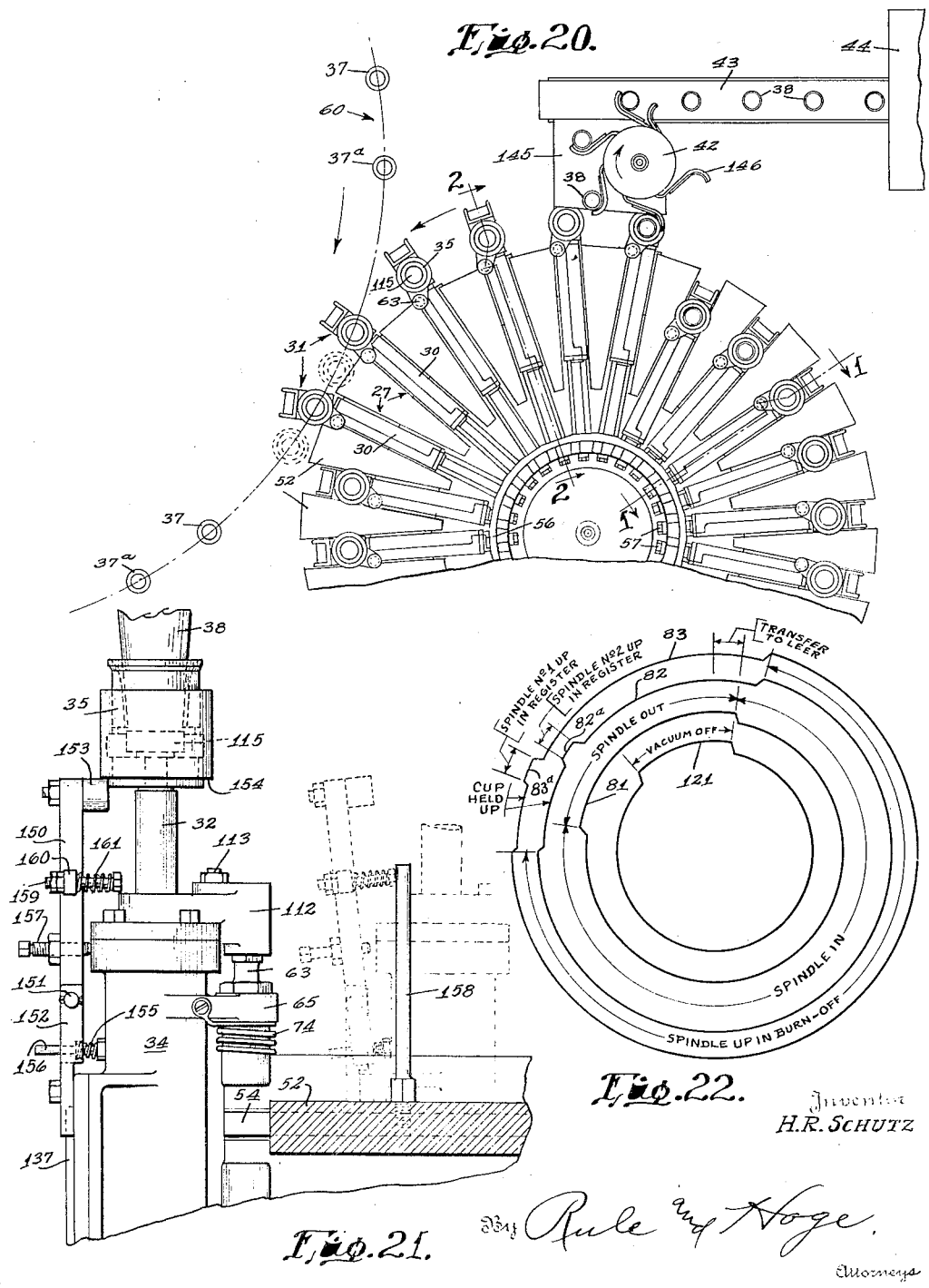

Patented Sept. 4, 1951

2,567,033

UNITED STATES PATENT OFFICE 2,567,033

COMBINED GLASS BURN-OFF AND TRANSFER MACHINE

Harold R. Schutz, Toledo, Ohio, assignor to Owens-Illinois Glass Company, a corporation of Ohio Application May 23, 1947, Serial No. 749,999

14 Claims. (Cl. 49—50)

My invention relates to mechanism for transferring articles from one position to another and is particularly adapted for use in handling blown glassware, such as tumblers, jars and the like during the manufacture of such ware. In the form herein illustrated, the transfer mechanism is embodied in a burn-off machine and comprises means for receiving the glass articles from the blowing machine, transferring the articles with the attached moil or waste glass to the burners by which the moil is severed from the blown articles, and thereafter transferring the articles to mechanism for conveying them to the annealing leer.

The transfer mechanism as herein shown, is particularly adapted for use in connection with an automatic glass blowing machine including a horizontally rotating carriage which delivers the blown articles in rapid succession to the transfer mechanism. An object of the invention is to provide transfer means including spindles carried on a burn-off machine and adapted to be brought into register with the finishing molds on the blowing machine, momentarily maintaining register during the delivery of the articles to the transfer spindles, and thereafter transferring the articles to the burners.

The invention is adapted for use with a glass blowing machine which delivers the blown articles in pairs from blowing spindles on a rotating carriage. An object of the invention is to provide transfer means adapted for receiving the blown articles in pairs and delivering them in succession to the burners of the burn-off machine and after the burn-off operation, transferring the articles singly and in succession to a conveyor or other receiving means.

Other objects of the invention will appear hereinafter.

Referring to the accompanying drawings:

Fig. 2A is a fragmentary sectional elevation of a portion of the transfer spindle and associated parts;

Figure 1:
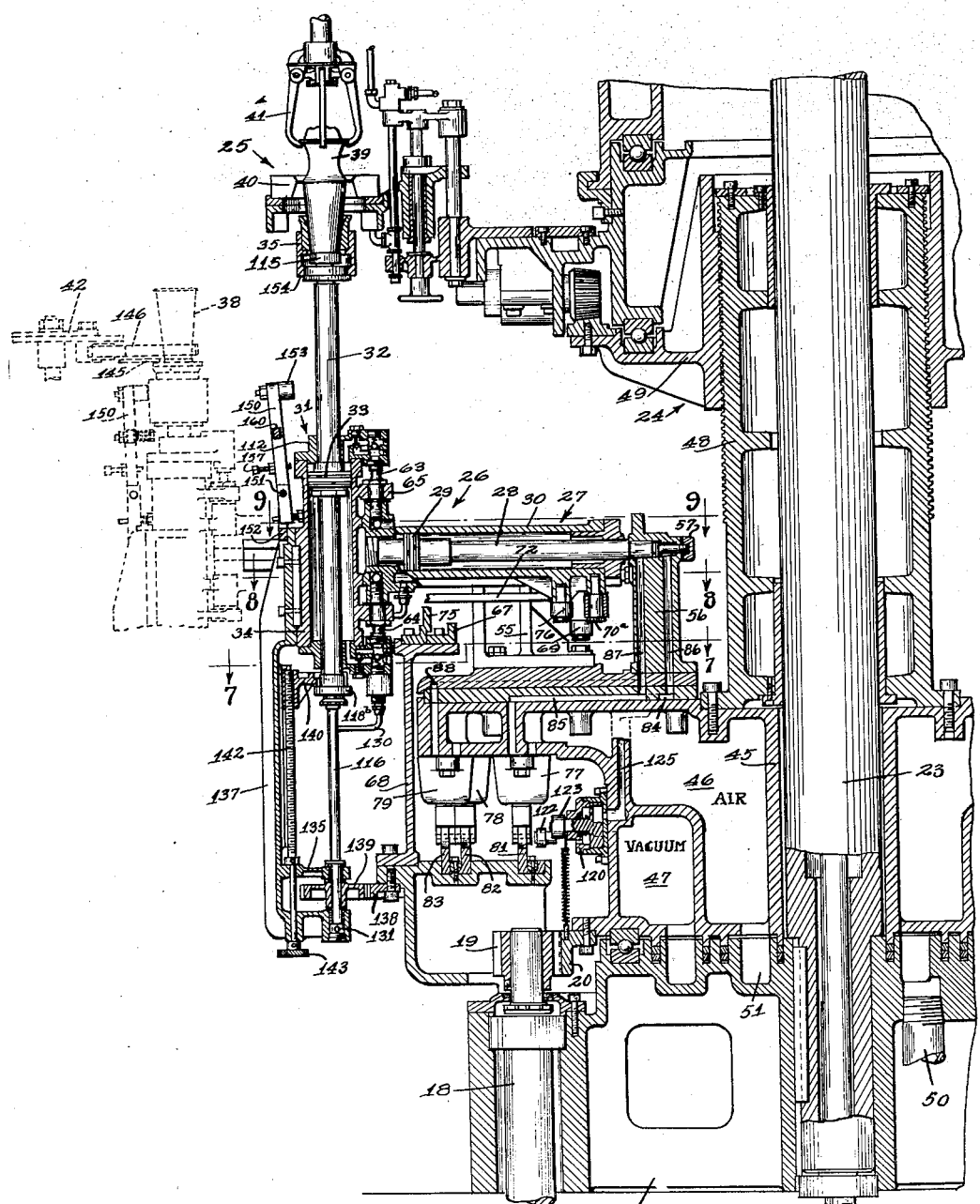
Fig. 1 is a sectional elevation of a combined burn-off and article transfer machine embodying my invention, parts of the machine being broken away, the section being at the line 1—1 on Fig. 20.
Figure 3:
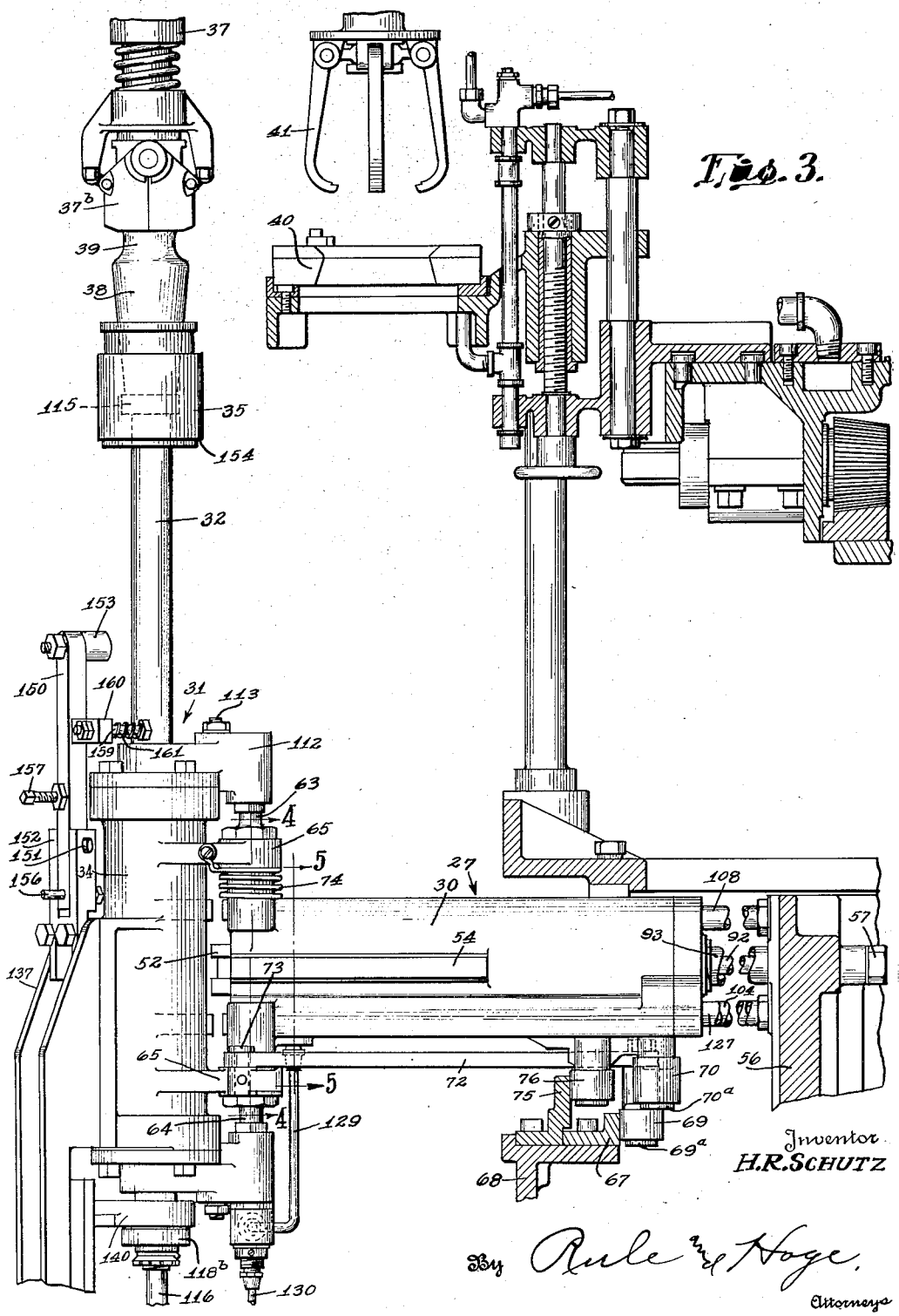
Fig. 3 is a part-sectional elevation of a transfer unit and the associated burn-off mechanism.
Figure 6:
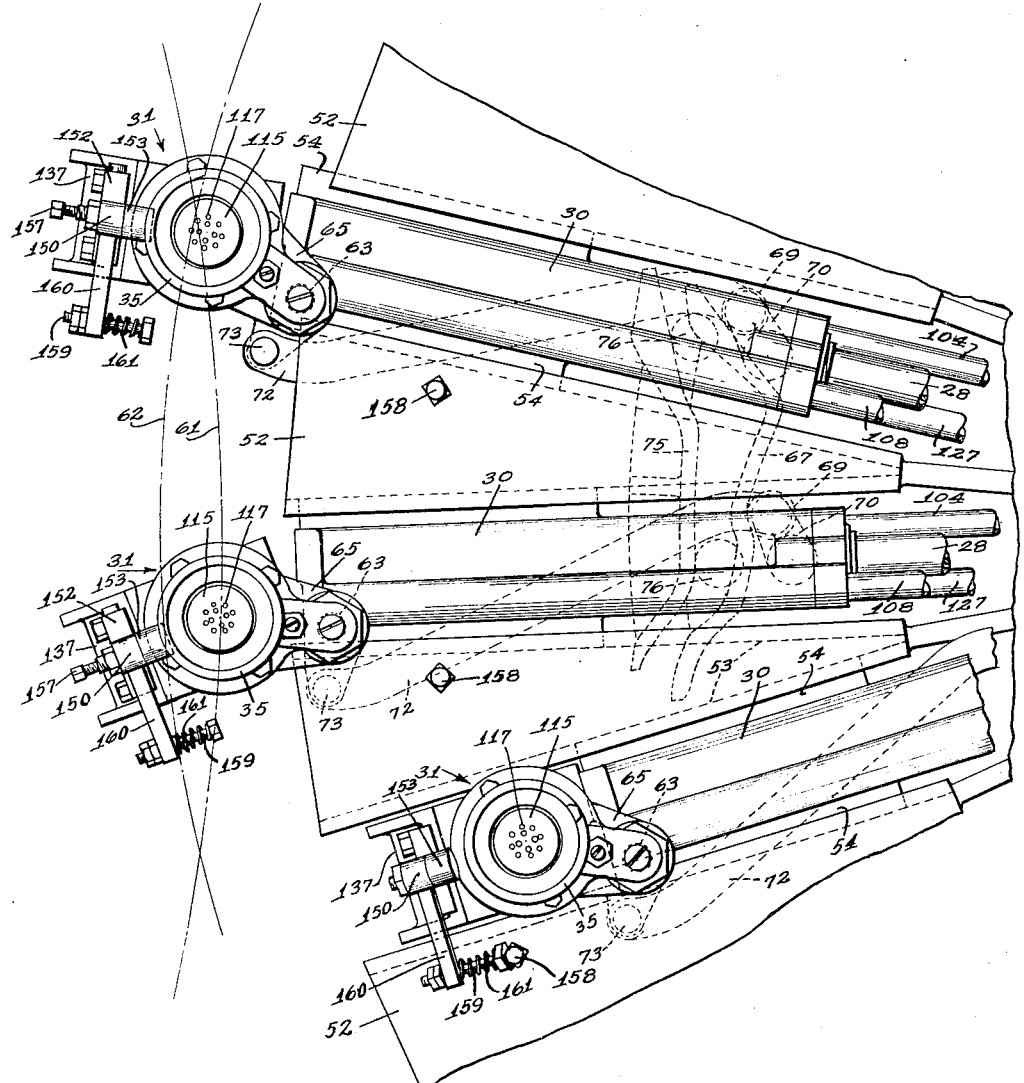
Figure 7:
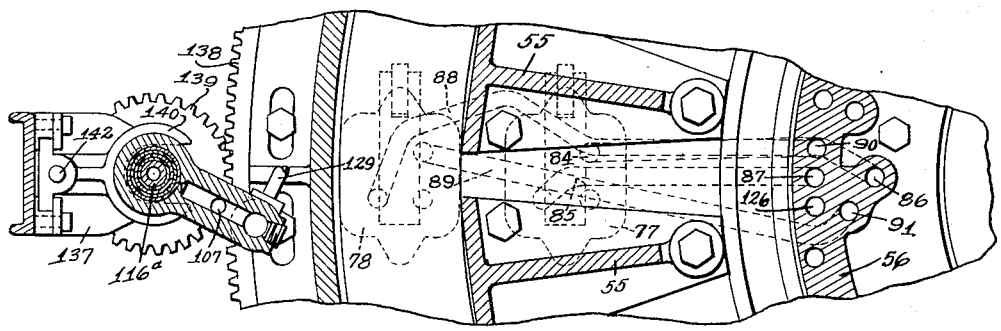
Figure 8:
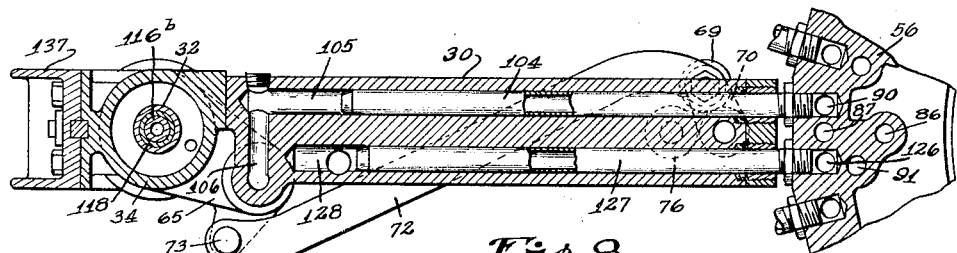
Figure 9:
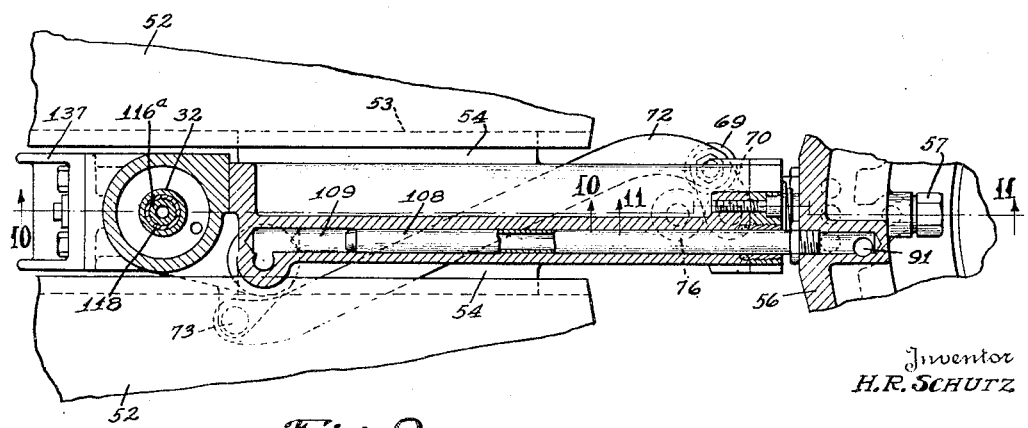
Figure 14:
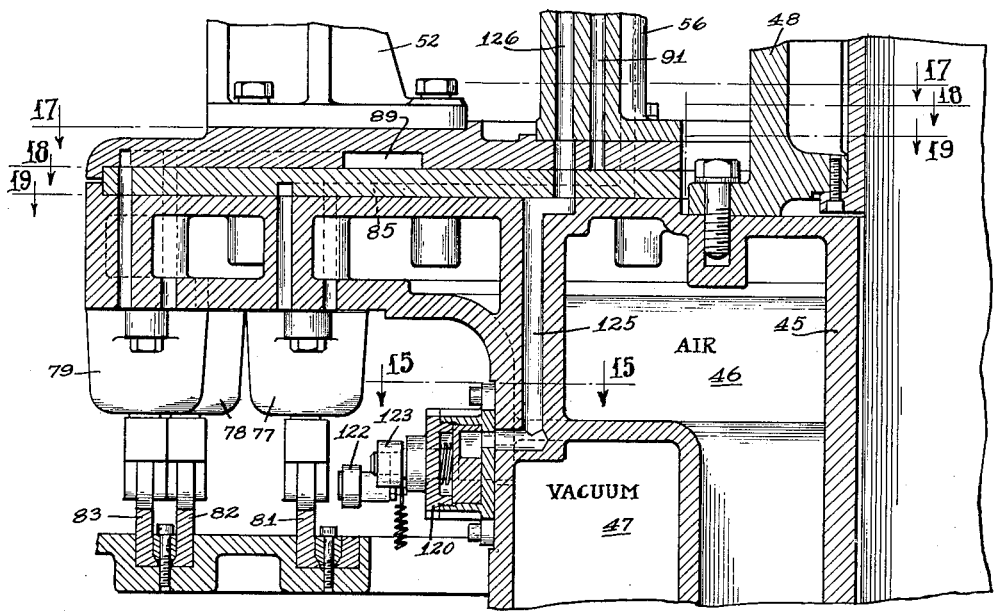
Figure 15:
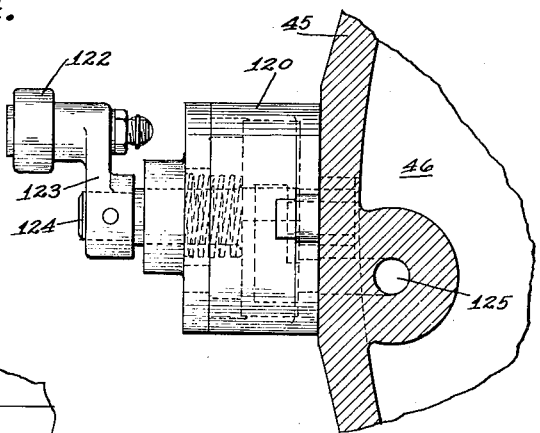
Figure 16:
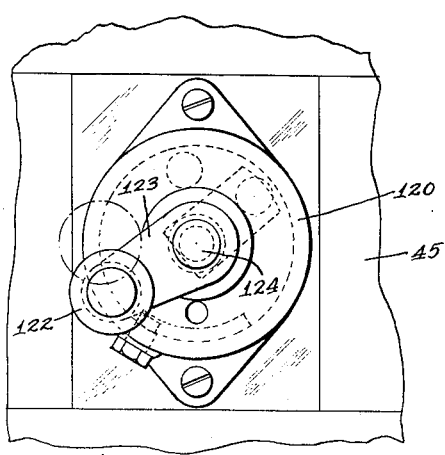
Figure 17:
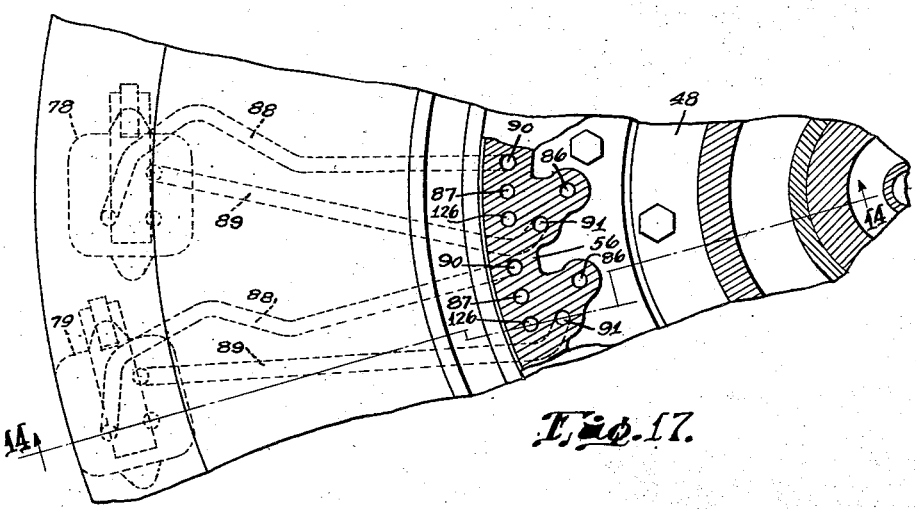
Figure 18:
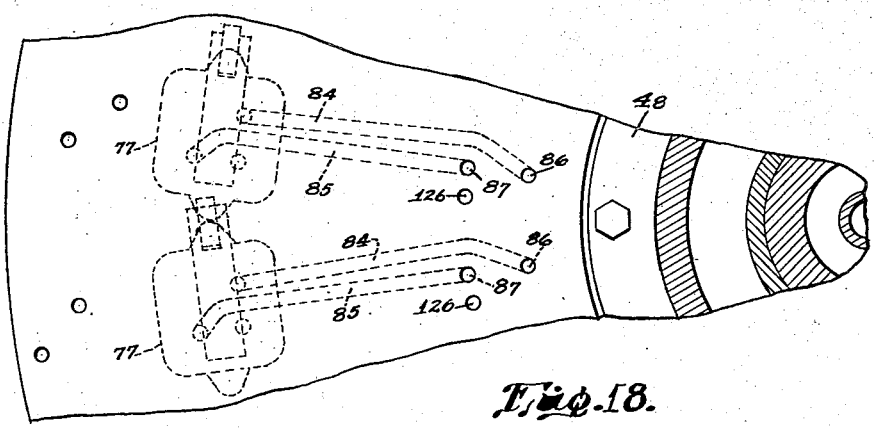
Figure 19:
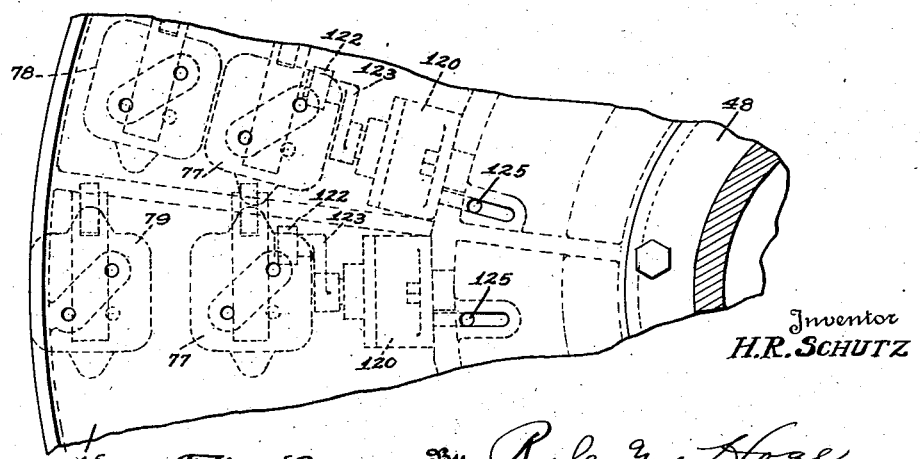

Figs. 4 and 5 are sections at the lines 4—4 and 5—5 respectively on Fig. 3;

Fig. 6 is a fragmentary plan view showing transfer units in article receiving position;

Figs. 7, 8 and 9 are horizontal sections taken substantially at the lines 7—7, 8—8 and 9—9 respectively, on Fig. 1;

Fig. 10 is a fragmentary sectional elevation of the horizontal piston and cylinder of a transfer unit, the section being at the line 10—10 on Fig. 9;

Fig. 11 is a similar view at the line 11—11 on Fig. 9, but with the cylinder shown in its projected position;

Fig. 12 is a fragmentary sectional elevation of the piston and cylinder shown in Fig. 11 but on a somewhat larger scale;

Fig. 13 is a section at the line 13—13 on Fig. 11;

Fig. 14 is a fragmentary sectional elevation at the line 14—14 on Fig. 17, showing the air and vacuum chambers, vacuum control valve and associated parts;

Fig. 15 is a section at the line 15—15 on Fig. 14, showing the vacuum control valve;

Fig. 16 is a front elevation of the same;

Figs. 17, 18 and 19 are fragmentary part-sectional plan views at the lines 17—17, 18—18, and 19—19 respectively on Fig. 14;

Fig. 20 is a diagrammatic plan view of the burn-off machine, the glass blowing machine and the means for transferring and delivering the blown articles to an annealing leer;

Fig. 21 is a sectional elevation showing a device for supporting a transfer cup during the transfer; and Fig. 22 is a cam chart.

In general terms, the combined burn-off and article transferring machine comprises a stationary base 22 (Fig. 1), a tubular vertical center column 23 having a fixed mounting in said base, a carriage 24 mounted for horizontal rotation about the column 23 and carrying an annular series of burn-off units 25 and article transfer units 26 individual to the burn-off units. Each transfer unit includes a piston motor 27 comprising a piston 29 and piston rod 28 having a fixed mounting on the carriage, and a cylinder 30 mounted for horizontal reciprocation radially of the carriage. A vertically disposed piston motor 31 is carried by the cylinder 30 at the outer end thereof and comprises a piston rod 32, piston 33 and cylinder 34. The piston rod 32 is in the form of a tube and extends above and below the cylinder 34, and at its upper end supports an article transfer cup 35 which is periodically projected upwardly into position to receive a workpiece as the latter is delivered from a spindle 37 of the blowing machine, and transfers it to the burner. The workpiece as shown, comprises a blown glass tumbler 38 with the attached moil or waste glass 39. The workpiece, during the transfer, is directly supported on a bottom plate 115 attached to the upper end of a rotary spindle 116 which extends through the tubular piston rod 32. The piston motors 27 and 31 operate to transfer the workpiece to the burner 40 of the associated burn-off unit which then operates to sever the moil from the tumbler while the moil is held by gripping jaws 41, after which the tumbler is delivered to a transfer device 42 (Fig. 20) which transfers the article to a conveyor belt 43 for conveying it to an annealing leer 44.

A more detailed description of the machine is as follows:

The carriage 24 is rotated continuously by a power driven shaft 18 to which is keyed a drive pinion 19 in mesh with a ring gear 20 on the carriage. The carriage includes a lower section 45 in the form of a drum comprising an air pressure chamber 46 and a vacuum chamber 47. Bolted to the drum 45 is a hub 48, screw-threaded to receive a correspondingly threaded hub or drum 49 which supports the burn-off units 25.

Air under pressure is maintained in the air chamber 46 for operating the piston motors 27 and 31. The compressed air is supplied to the chamber 46 through a pipe 50 (Fig. 1) opening into an annular channel 51 communicating with the air chamber. A partial vacuum is maintained in the vacuum chamber 47 and serves to apply suction through the perforated bottom plates 115 (Fig. 2) within the transfer cups 35 for gripping and holding the workpieces during the transfer, as hereinafter described.

The horizontal motor cylinders 30 are mounted for horizontal reciprocating movement radially of the carriage, the cylinders being slidably supported on plates 52 formed with guideways 53 (Figs. 4 to 6) in which ribs 54 formed on the cylinders are slidable. The plates 52 are carried on brackets 55 (Figs. 1 and 7) mounted on the drum 45. Each piston rod 28 is attached at its inner end to a drum-shaped casting or support 56 mounted on the drum 45, the piston rod being removably held in place by a nut 57 threaded on the rod. When the nut 57 is removed it permits the entire transfer unit to be withdrawn from the machine.

When the horizontal cylinder 30 has been moved outward, the vertical piston motor 31 operates to project the transfer cup 35 into position to receive the workpiece from the blowing machine 60, shown diagrammatically in Fig. 20. The blowing machine, which is positioned at one side of the burn-off machine, has its spindles arranged in pairs, each pair including a spindle 37 and a spindle 37ᵃ. Each pair of spindles while traversing the transfer zone, releases the two workpieces 38 carried by the spindles, to two of the transfer cups 35 directly beneath and in register with the spindles.

In order to maintain the spindles and transfer cups or holders 35 in register during the time required to make the transfer, the cups 35 are given a supplemental cam controlled movement by which they are caused to travel in register with the spindles along the path of the spindles indicated by the broken line 61 (Fig. 6) concentric with the blowing machine and intersecting the line 62 concentric with the burn-off machine carriage. To permit this supplemental movement, the vertical motor cylinder 34 is mounted to swing horizontally about the axis of a pair of vertical, aligned, tubular shafts 63 and 64 (Figs. 2 and 3) which extend through bearing lugs 65 formed on the cylinder, the shafts being attached to the outer end or head 66 of the horizontal cylinder 30.

The swinging movement of the vertical cylinder is under the control of a stationary cam 67 (Figs. 1, 3 and 6) mounted on a stationary casting 68 or drum extending circumferentially of the burn-off machine. A cam follower roll 69 running on the cam 67 is carried on a pivot pin 69ᵃ which connects one end of a short rock arm 70 to the inner end of a link 72. The other end of the rock arm is connected by a pivot pin 70ᵃ to the cylinder 30. The link 72 extends outwardly along the cylinder 30 and at its outer end is connected by a pivot pin 73 to a lug on the vertical cylinder 34. The cam 67 is in position to be engaged by the roll 69 when the transfer spindle is in its projected position and the roll is held to the cam by means of a torsion spring 74 (Figs. 2 and 3).

In addition to the swinging movement of the transfer spindle about the shafts 63, 64, the cylinder 30 is given a short cam controlled in-and-out radial movement as required, in combination with such swinging movement, to maintain registry during the transfer. Such radial movement is under the control of a cam 75 (Figs. 1, 3 and 6) on which runs a cam follower roll 76 journalled on a stud shaft attached to the cylinder 30.

Air under pressure for moving the cylinders 30 in and out and for lifting and lowering the spindles is supplied from the pressure chamber 46 under the control of valve units mounted on the under side of said chamber. These units, positioned as shown in Figs. 17, 18 and 19, include valves 77 individual to the transfer units and controlling the air pressure for operating the cylinders 30. The valve units also include valves 78 and 79, each operable to control the up-and-down movements of a spindle. The valves 77, 78, and 79 are actuated respectively, by cams 81, 82 and 83 (Figs. 1 and 2). These valves may be of conventional construction, such as, for example, those on the market under the trade name "Quick-As-Wink" valves. The valves 78 and 79 are arranged in staggered relation or in alternation at different radial distances from the axis of the machine to permit the alternate valves to be controlled by separate cams, thereby permitting the transfer spindles to be lifted in pairs.

Figure 2:
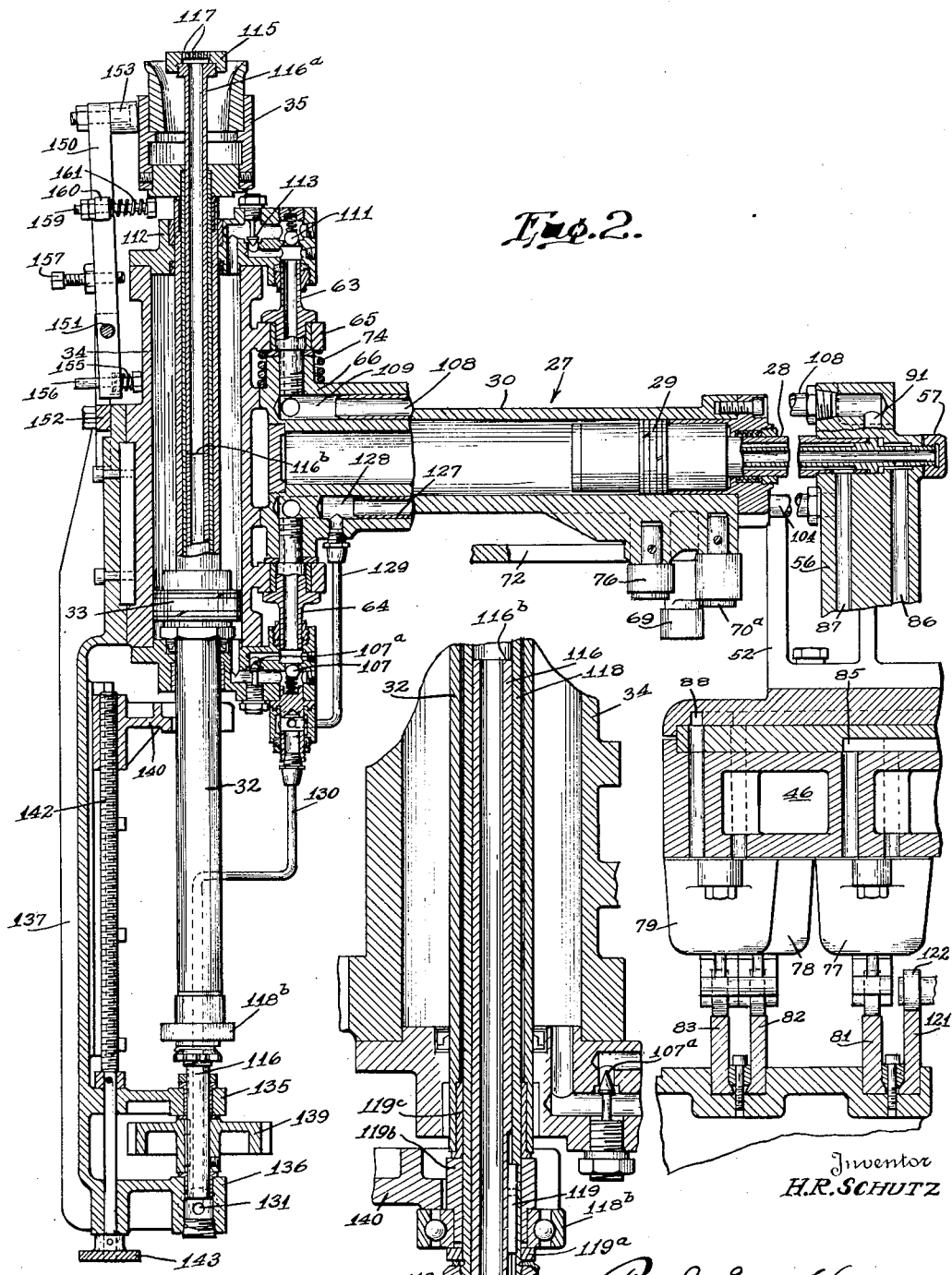
Fig. 2 is a sectional elevation at the line 2—2 on Figs. 20 and 4, showing one of the transfer units.

Referring to Fig. 18, the air pressure lines through which air is supplied for moving the cylinder 30 out and in, include channels 84 and 85 which extend from the valve 77 to vertical channels 86 and 87 in the casting 56 (see Figs. 2 and 11). Extending in like manner from each valve 78 and 79 are horizontal channels 88 and 89 which extend respectively to vertical channels or bores 90 and 91 in the casting 56.

Referring to Figs. 10 to 13, the stationary piston rod 28 comprises concentric inner and outer tubes 92 and 93 with an intervening annular channel 94 through which air under pressure is conveyed from the vertical channel 87 to the forward end of the piston rod where the air is admitted behind the piston to the cylinder 30 for retracting the latter as presently described. Air under pressure for projecting the cylinder forward is conducted from the vertical channel 86 (Fig. 11) through a port 92ᵃ into the tube 92 and through the latter to and through a check valve 95 in the piston 29. The air pressure is thus applied to the end plate 95ᵃ of the cylinder 30 so that the cylinder is driven forward.

The piston 29 is provided with bearing rings 97. The two end portions of the piston are of somewhat reduced diameter to enter bearing sleeves 98 and 99 in the outer and inner ends respectively of the cylinder 30. As the cylinder is retracted, the air in front of the piston escapes freely through ports 96 at the forward end of the piston and is exhausted through the inner tube 92 until the piston enters the sleeve 98 (Fig. 10), thereby shutting off the ports 96 and cushioning the final retracting movement of the cylinder. The air during this final movement escapes through a restricted opening 100 (Fig. 12).

The check valve 95 permits a supply of air to the cylinder for starting it on its outward movement, the air supply being continued through the ports 96 after they clear the sleeve 98. As the cylinder 30 moves outward, the air therein behind the piston is exhausted through the channel 94 and ports 102 until the piston nears the limit of its outward movement and the air exhaust through the channel 94 and port 102 is cut off by the sleeve 99, thus cushioning the final outward movement of the piston. The inward movement of the cylinder 30 is effected by air pressure supplied through channel 94, to the piston and past a check valve 103 which operates in the same manner as the valve 95 to allow the cylinder to be started on its inward travel.

Air under pressure for lifting the piston rod 32 and piston 33 is supplied through the valve 78 (Fig. 17), channel 88, vertical bore 90 to a tubular rod 104 (Fig. 8) which is attached to the casting 56 and extends telescopically within a horizontal bore 105 extending lengthwise through the cylinder 30. At its forward end the channel 105 opens into a cross channel 106 (Figs. 8 and 4), the latter opening into the tubular pivot shaft 64. The pressure line continues from the lower end of the shaft 64 (Fig. 2) past a check valve 107 and through the lower head of the cylinder 34, thereby supplying air pressure beneath the piston 33 for lifting the piston and the piston rod 32.

The piston rod and piston are moved downward by air pressure supplied through the valve 78 (Fig. 17) and the channels 89, 91 to a tubular shaft 108 (Fig. 9) attached to the casting 56 and extending telescopically into a bore 109 in the cylinder 30. The bore 109 communicates with the tubular pivot shaft 63 (Figs. 4 and 2). The pressure line extends from the upper end of the shaft 63 past a check valve 111 and through the upper cylinder head 112, thus supplying air above the piston 33 for lowering the piston rod and piston. When the piston is moved upward, the air above the piston is exhausted through the pressure line just described, leading from the valve 78, but the check valve 111 is by-passed and the flow restricted by an adjustable throttle valve 113, thereby controlling the speed of the piston and piston rod. Downward movement of the piston is controlled in like manner by a throttle valve 107a.

Referring to Figs. 1 to 3, a rotary tubular spindle, comprising a lower section 116 and an upper section 116a, extends lengthwise through the tubular piston rod 32, the upper section having a limited up and down movement relative to the lower section as presently described. When the piston is in its lowered position (Fig. 2) the upper section of the spindle rests on the upper end 116b of the lower section. The spindle section 116a carries at its upper end a pad 115 which serves as a bottom plate for the cup 35 and supports the workpiece during the transfer, said plate being provided with perforations 117, permitting suction to be applied through the spindle and said pad for holding the workpiece securely during the transfer. The rotary spindle also includes a tube or sleeve 118 surrounding the spindle sections 116, 116a and extending the full length of the piston rod 32. The tube 118 is splined by a key 119 (Fig. 2A) to the section 116 for rotation therewith and up-and-down sliding movement thereon. The tube 118 is attached to and rotates the transfer cup 35. The lower end of the tube 118 is journalled for rotation in a ball bearing cage 118b (Fig. 2A) at the lower end of the piston rod.

A nut 118c, threaded on the lower end of the tube 118, supports the ball bearing cage 118b, a washer 119a being interposed between said nut and the bearing cage. A collar 119b is interposed between the ball bearings and the lower end of the tubular piston rod 32. A bearing sleeve 119c fitted in the lower end of the piston rod 32, holds the tube 118 centered within the piston rod, the tube 118 being free for rotation within the bearing 119c. It will be seen that by the above construction the tube 118, which forms one of the telescoping sections of the spindle, is connected for up and down movement with the piston rod 32. That is, the piston rod is held between the transfer cup 35 and the nut 118c attached to the upper and lower ends respectively of the spindle section 118, so that said section 118 is compelled to move up and down with the piston rod and piston.

The tubular spindle 116 is intermittently brought into communication with the vacuum chamber 47 for applying suction under the control of a suction valve 120 (Figs. 14, 15 and 16). The valve is actuated by a cam 121 (Fig. 2) on which runs a cam follower roll 122 on a crank shaft 123 keyed to the valve stem 124. When the valve is in open position the suction line is established from the vacuum chamber through the valve and the channel 125 (Fig. 14) which opens into a channel 126 extending upwardly through the casting 56 (Figs. 14 and 8). The vacuum line is continued through a tubular shaft 127 extending into a bore 128 in the cylinder 30. The suction line is continued through pipes 129 and 130 (Fig. 2), the latter opening at its lower end through a port 131 to the tubular spindle 116.

The spindle 116 is journalled near its lower end in bearings 135 and 136 formed on a bracket arm 137 which is bolted to the motor cylinder 34. The spindle is intermittently rotated by means of a stationary ring gear 138 bolted to the machine base. A gear pinion 139 keyed to the spindle 116 is brought into mesh with the gear 138 when the motor cylinder 30 is in its retracted position, Fig. 1. The upward movement of the piston 33 is limited by a stop arm 140 in the path of the ball bearing cage 118b. The stop arm 140 is mounted on a screw-threaded rod 142 which is rotatable by means of a knob 143 for adjusting the stop arm up and down and thereby adjusting the stop position of the transfer cup 35 to the length or height of the workpieces. While the piston 33 is in its lowered position, the bottom plate 115 projects above the transfer cup as shown in Fig. 2. When the piston is moved upward, the cup 35 and spindle sleeve 118 are carried with it. During the initial upward movement of the piston 33, the spindle section 116a may remain in its lowered position until the bottom plate 115 is seated within the cup, the spindle section 116a being then carried upward with the piston until the latter is arrested by the stop arm 140. It will be seen that the spindle sections 116 and 116a both have a telescopic sliding connection with the surrounding sleeve 118 permitting the spindle to be extended lengthwise without breaking the suction line or permitting leakage when the inner sections are separated.

In order to positively prevent a workpiece from accidentally falling off the spindle during the transfer from the blowing machine to the burner, I have provided a locking device for preventing downward movement of the transfer cup relative to the bottom plate 115 during the transfer. Such locking device, as shown for example, in Figs. 3, 6 and 21, comprises a vertically disposed rocker arm 150 mounted by means of a pivot pin 151 for swinging movement on a bracket 152 bolted to the arm 137. The arm 150 carries at its upper end a stop lug 153 adapted to engage beneath a shoulder 154 on the transfer cup as shown in Fig. 21. The arm 150 is swung inwardly to such position by a coil compression spring 155 mounted on a headed pin 156 which abuts the motor cylinder 34 and extends loosely through an opening in the arm 150. The inward swinging movement of the arm 150 is stopped by an adjustable stop screw 157.

In order to withdraw the arms 150 from beneath the transfer cups, posts 158 (Figs. 6 and 21) individual to the transfer units are mounted on the plates 52 in the paths of stop pins 159. Each said stop pin is carried on an arm 160 attached to and projecting laterally from the arm 150. Coil compression springs 161 on the pins 159 serve as cushioning devices when said pins strike the posts 158.

*Operation*

The operation of the transfer mechanism will now be given in connection with the cam chart, Fig. 22, which illustrates diagrammatically the timing and sequence of the movements of the spindles.

As the blowing machine 60 (Fig. 20) and the burn-off machine carriage rotate continuously in the direction indicated by the arrows, a pair of blowing spindles 37, 37ᵃ is brought to the transfer zone in which said spindles are positioned over the two transfer spindles which, at this time, are travelling through said zone as shown in Figs. 6 and 20. As indicated in Fig. 22, the high part of the cam 81, which controls the horizontal movements of the cylinders 30, maintains said cylinders and transfer spindles in their outwardly projected position (Fig. 2) during the transfer. The high parts 82ᵃ and 83ᵃ (Fig. 22) of the cams 82 and 83 which control the vertical cylinder motors, cause the latter to project the transfer spindles upwardly to the Fig. 3 position in which the workpieces 38 extend into the transfer cups 35. The jaws 37ᵇ of the blowing spindles are then opened to release the two workpieces to the transfer cups.

During this transfer, the cups are given a movement supplemental to their travel with the carriage, which comprises the combined swinging movement of each cylinder 34 and its cup 35 about the vertical axis of the shafts 63, 64 under the control of the cam 67 (Figs. 3 and 6), and the movement of the cylinder 30 radially of the carriage under the control of the cam 75. By such supplemental movement, the travel of the transfer spindles is deflected from the arc 62 (Fig. 6) in which they would otherwise travel, to the path indicated by the arm 61, in which the blowing machine spindles travel.

When the workpieces are delivered to the transfer cups 35, they are securely held to the spindles by means of suction applied through the bottom plates or pads 115, such suction being under the control of the cam 121 (Fig. 22). The suction is maintained throughout the burn-off operation and may be released immediately before the workpieces are removed from the spindles.

Immediately after the workpieces are released from the blowing machine spindles, the transfer spindles with the cups 35 are lowered to the Fig. 21 position in which the downward movement of each cup 35 is arrested by a stop lug 153. The transfer cup is thus prevented from moving down to the Fig. 2 position in which the pad 115 projects above the cup.

After the spindles have been lowered they are drawn inwardly by the cylinders 30 under the control of the cam 81 and thereby brought directly beneath the burners 40. At the same time and by this movement, the pinions 139 are brought into mesh with the ring gear 138 and thereby start the rotation of the transfer cups and spindles. The two pistons 33 are then moved upward under the control of the cams 82, 83 so that the workpieces are positioned within the ring burners 40 (Fig. 1). The moils 39 are now gripped and held by the jaws 41 until after they are severed from the tumblers by the burners. The spindles remain in their elevated position until they are close to the transfer device 42 (Fig. 20), by which time the burn-off operation has been completed. The spindles are then lowered. It will be noted that at this time, the stop arms 150 are held in their outwardly swung position as shown in broken lines, Fig. 21, so that the transfer cups 35 can be moved to their fully lowered position (Fig. 2), below the level of the bottom plate 115. Immediately after the spindles are thus lowered, they are projected outwardly under the control of the cam 81, into the path of the transfer arms 146 which transfer them to the conveyor 43, the latter carrying them to the annealing leer 44.

The locking device comprising the arm 150 (Fig. 21) for holding the cup 35 as herein described, serves as a means auxiliary to the vacuum means for holding the workpiece, but I have found that it is not always necessary to use such auxiliary device. On the other hand, it may often be used as a substitute for the suction holding means, avoiding the necessity of providing vacuum lines and other mechanism for applying suction. The latter however, is effective for holding the workpieces in a manner to insure rotation with the spindles.

Modifications may be resorted to within the spirit and scope of my invention.

I claim:

1. A machine for transferring articles from one position to another, comprising a carriage mounted for rotation about a vertical axis, means for rotating the carriage, a piston motor mounted on the carriage for rotation therewith and comprising a cylinder extending radially of the carriage and mounted for lengthwise reciprocation radially of the carriage, a second piston motor mounted on and carried by said cylinder and rotatable therewith about said axis, said second motor comprising a vertical cylinder, piston and vertical tubular piston rod, means for reciprocating the piston and piston rod vertically, a spindle extending lengthwise through said piston rod, an article holder attached to the spindle at the upper end thereof, means connecting the spindle for up-and-down movement with the piston, the piston rod and piston having a lost motion connection with said spindle permitting a limited initial upward movement of the piston rod relative to spindle, and means connected to the piston rod and moved thereby during said initial movement, into position to retain an article on said holder, and automatic means for effecting said radial and vertical movements alternately and in synchronism.

2. A machine for transferring articles from one position to another, comprising a carriage mounted for rotation about a vertical axis, means for rotating the carriage, a piston motor mounted on the carriage for rotation therewith and comprising a cylinder extending radially of the carriage and mounted for lengthwise reciprocation radially of the carriage, a second piston motor mounted on and carried by said cylinder and rotatable therewith about said axis, said second motor comprising a vertical cylinder, piston and vertical tubular piston rod, a tubular spindle extending lengthwise through said piston rod, means forming a lost motion connection between the spindle and piston by which the spindle is moved up and down with the piston with a limited initial upward movement of the piston relative to the spindle, a workpiece holder attached to the upper end of the spindle, means for applying suction through the spindle and holder for holding an article in position on the spindle, and supplemental holding means connected to the piston and brought by said initial movement of the piston into operative position for retaining the workpiece on the holder.

3. The combination of a carriage mounted for rotation about a vertical axis, means for rotating the carriage, a piston motor mounted for rotation with the carriage and comprising a vertical cylinder and a piston reciprocable vertically therein, a vertical spindle comprising telescopically connected sections, one of the sections of the spindle being connected to the piston for up-and-down movement therewith, an article holder attached to said last mentioned section of the spindle, a gear pinion connected to the other section of the spindle, a stationary ring gear concentric with the axis of the carriage, and means for moving said motor and spindle radially of the carriage and thereby moving said pinion into and out of mesh with the ring gear.

4. The combination of a carriage mounted for rotation about a vertical axis, means for rotating the carriage, a piston motor mounted on the carriage for rotation therewith and comprising a piston rod and a cylinder extending radially of the carriage, one of said parts of the piston motor being reciprocable in a direction radially of the carriage, a spindle carrier carried by and pivotally connected to said reciprocable part for swinging movement about a vertical axis, a vertical spindle on the carrier and positioned laterally of the last mentioned axis, an article holder attached to said spindle, and automatic means operable during the rotation of the carriage for effecting said swinging of the spindle carrier and thereby causing the article holder to travel in a predetermined path.

5. The combination of a carriage mounted for rotation about a vertical axis, a horizontal piston motor comprising a piston rod secured to the carriage and extending radially thereof and a cylinder mounted for reciprocation lengthwise of the piston rod, a vertical piston motor comprising a vertical piston rod and a vertical cylinder carried by and pivotally connected to said horizontal cylinder adjacent to the outer end of the latter for swinging movement about a vertical axis positioned laterally of the axis of said vertical cylinder, an article holder connected to the vertical piston rod for up-and-down movement therewith, and automatic means for actuating said piston motors during the rotation of the carriage and for effecting said swinging of the vertical piston motor and spindle.

6. The combination of a carriage mounted for rotation about a vertical axis, a horizontal piston motor comprising a piston rod secured to the carriage and extending radially thereof and a cylinder mounted for reciprocation lengthwise of the piston rod, a vertical piston motor comprising a vertical piston rod and a vertical cylinder pivotally connected to said horizontal cylinder adjacent to the outer end of the latter for swinging movement about a vertical axis, an article holder connected to the vertical piston rod for up-and-down movement therewith, automatic means for supplying fluid under pressure to the piston motors and operating them in a predetermined order of sequence during the rotation of the carriage, cam means for effecting said swinging of the vertical cylinder during the rotation of the carriage, and cam means for moving the said horizontal cylinder radially of the carriage independently of said fluid pressure operation.

7. A combined burn-off and article transfer machine comprising a carriage mounted for rotation about a vertical axis, means for continuously rotating the carriage, a ring burner on the carriage, a horizontal piston motor comprising a horizontal piston rod attached to the carriage and extending radially thereof and a horizontal cylinder mounted for reciprocation radially of the carriage, a vertically disposed piston motor comprising a vertical cylinder attached to said horizontal cylinder and a vertical tubular piston rod mounted for vertical reciprocation, a spindle extending lengthwise through said vertical piston rod, an article holder attached to the spindle at the upper end thereof, means for supplying fluid under pressure for operating the piston motors, valves mounted on the carriage and controlling the supply of fluid to the motors, stationary cams arranged to actuate the valves in the predetermined order of sequence required to effect the following operations of the piston motors and in the following order, namely, first, projecting the horizontal cylinder outward while the spindle is in lowered position and thereby bringing the article holder into position to receive a blown glass article from a blowing machine, then retracting the horizontal cylinder and thereby bringing the spindle and article holder with the article therein beneath the burner, then moving the vertical piston rod upward and thereby positioning the blown article within the burner, and after the burn-off operation moving the vertical piston rod down for lowering the blown article from the burner.

8. The combination of a carriage mounted for rotation about a vertical axis, means for rotating the carriage, a fluid operated motor mounted on the carriage for rotation therewith and comprising a movable element mounted for reciprocation radially of the carriage during said rotation, means for supplying fluid under pressure to the motor and causing said radial reciprocation, means for controlling said reciprocation and holding said movable element in its outwardly projected position during a predetermined portion of the rotation of the carriage, a workholder carried by and movable with said element, a stationary cam, a cam follower carried on said element and brought into operative relation to the cam by the movement of said element while the latter is held in its projected position, and means forming an operating connection between the cam follower and workholder, said cam being positioned and formed to effect radial movement of the workholder while said element is held in its projected position.

9. The combination of a carriage mounted for rotation about a vertical axis, means for rotating the carriage, a piston motor mounted on the carriage and comprising a cylinder and a piston rod extending radially of the carriage, means attaching the piston rod in a fixed position on the carriage, means for supplying fluid pressure to the motor and thereby moving the motor cylinder radially of the carriage, a vertically disposed spindle, an article holder on the spindle, a carrier for the spindle pivotally connected to the said cylinder adjacent to the outer end thereof for swinging movement about a vertical axis, a stationary cam, a cam follower carried by said cylinder and positioned to engage the cam when the motor cylinder is in an outwardly projected position, the cam being shaped and positioned to impart a radial movement to the said cylinder supplemental to the said movement of the cylinder under fluid pressure, a second cam, a second cam follower connected to said cylinder, and operating connections between said second follower and the spindle carrier for swinging the latter about its said vertical axis, said second cam being arranged to cause said swinging movement concurrently with the movement controlled by the first cam.

10. Article transfer mechanism including a spindle, a carrier on which the spindle is mounted for up-and-down movement, a transfer cup mounted at the upper end of the spindle for up-and-down movement therewith, said cup extending above the spindle to receive an article with the latter supported on the spindle, automatic means for moving the cup up and down relative to the spindle for withdrawing it from the workpiece on the spindle, automatic means for locking the cup in its lifted position relative to the spindle, said locking means comprising a locking arm mounted on the carrier for movement into and out of a locking position in which it holds the cup in its said lifted position, means for moving said carrier from one position to another, and means in the path of said locking arm for moving it out of locking position when the carrier is moved to a predetermined position.

11. Article transfer mechanism comprising a carrier mounted for movement from one position to another, a vertically disposed spindle comprising a section mounted on said carrier, an article-holding cup attached to said section, said spindle including a second section, a bottom plate for said cup attached to said second section, means for moving the first mentioned section and cup up and down on the carrier, a stop arm mounted on the carrier for movement relative thereto into and out of position to lock the cup in its elevated position, and automatic means operative by the movement of said carrier for withdrawing the stop arm and permitting lowering of said cup relative to said bottom plate.

12. The combination of a carriage mounted for rotation about a vertical axis, means for rotating the carriage, a stationary ring gear concentric with said axis, a vertically disposed spindle mounted on the carriage for rotation about its own axis and positioned at one side of the axis of the carriage, said spindle comprising telescopic tubular sections including a vertically movable upper section and a lower section, an article holder at the upper end of the spindle attached to said movable section, means for applying suction through said spindle and thereby holding an article within said holder, a gear pinion attached to said lower section of the spindle, and means for intermittently moving the spindle periodically radially of the carriage to and from a position in which said pinion is in mesh with the ring gear and thereby causing intermittent rotation of the spindle about its axis.

13. The combination of a carriage mounted for rotation about a vertical axis, a spindle mounted on the carriage for rotation about its own axis and for movement radially of the carriage, said spindle comprising telescopically connected tubular sections, an article holding cup attached to one of said sections of the spindle, a perforated workholding pad attached to the other section of the spindle, means for applying suction through the spindle and said pad for holding an article supported on the pad, a stationary ring gear mounted concentrically with the axis of the carriage, a gear pinion mounted on said spindle, means for causing relative lengthwise movement of the spindle sections and thereby withdrawing the cup while the article is held by suction on said pad, means for continuously rotating the carriage, automatic means for periodically moving the spindle toward and from the axis of the carriage and thereby moving the said pinion into engagement with the said ring gear and causing rotation of the spindle and the article carried thereby about the axis of the spindle.

14. Article transfer mechanism comprising a carrier, a vertical spindle mounted on the carrier and including relatively movable sections, an article holding cup attached to the upper end of one section of the spindle, a bottom plate for said cup attached to the other section, said cup and attached section being movable downward relatively to the other section for withdrawing the cup from an article supported on said bottom plate, a stop arm mounted on the carrier for swinging movement into and out of a position to lock said cup in its elevated position, said carrier being mounted for said horizontal movement, and means in the path of said stop arm for withdrawing it from its locking position when the carrier is moved to a predetermined position and thereby permitting the lowering of said cup.

HAROLD R. SCHUTZ.

REFERENCES CITED

The following references are of record in the file of this patent:

UNITED STATES PATENTS

| Number | Name | Date |
|---|---|---|
| 539,132 | James | May 14, 1895 |
| 1,320,162 | Marsh et al. | Oct. 28, 1919 |
| 1,577,654 | Parker | Mar. 23, 1926 |
| 1,654,091 | Peiler | Dec. 27, 1927 |
| 1,887,211 | Mortimer | Nov. 8, 1932 |
| 1,974,837 | Shillinger et al. | Sept. 25, 1934 |
| 2,191,143 | Hiatt et al. | Feb. 20, 1940 |
| 2,247,787 | Schmidt | July 1, 1941 |
| 2,268,075 | Langer | Dec. 30, 1941 |
| 2,290,012 | Barnard et al. | July 14, 1942 |
| 2,359,432 | McNamara | Oct. 3, 1944 |
| 2,402,452 | Schreiber | June 18, 1946 |
| 2,408,599 | Bennett | Oct. 1, 1946 |
| 2,410,345 | Hinkley | Oct. 29, 1946 |